United States Patent
Tsujibayashi

(10) Patent No.: US 12,202,300 B2
(45) Date of Patent: Jan. 21, 2025

(54) HEAVY DUTY TIRE

(71) Applicant: Sumitomo Rubber Industries, Ltd., Kobe (JP)

(72) Inventor: Satoko Tsujibayashi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 227 days.

(21) Appl. No.: 17/967,410

(22) Filed: Oct. 17, 2022

(65) Prior Publication Data

US 2023/0135384 A1    May 4, 2023

(30) Foreign Application Priority Data

Nov. 2, 2021  (JP) .................................. 2021-179639

(51) Int. Cl.
*B60C 11/12*  (2006.01)
*B60C 11/03*  (2006.01)

(52) U.S. Cl.
CPC ...... *B60C 11/0306* (2013.01); *B60C 11/1236* (2013.01); *B60C 11/125* (2013.01); *B60C 11/1281* (2013.01); *B60C 2011/0351* (2013.01); *B60C 2011/0355* (2013.01)

(58) Field of Classification Search
CPC ............................ B60C 11/1281; B60C 11/125
See application file for complete search history.

(56) References Cited

U.S. PATENT DOCUMENTS

| | | | |
|---|---|---|---|
| 2014/0158261 A1* | 6/2014 | Takahashi | B60C 11/0306 152/209.1 |
| 2016/0159158 A1* | 6/2016 | Washizuka | B60C 11/1236 152/209.8 |
| 2016/0193883 A1* | 7/2016 | Kitani | B60C 11/11 152/209.25 |
| 2017/0106702 A1* | 4/2017 | Ito | B60C 11/1204 |
| 2019/0126686 A1* | 5/2019 | Asano | B60C 11/1236 |

FOREIGN PATENT DOCUMENTS

| | | | | |
|---|---|---|---|---|
| JP | 2007131059 A | * | 5/2007 | ......... B60C 11/1281 |
| JP | 2008-273306 A | | 11/2008 | |

OTHER PUBLICATIONS

English machine translation of JP2007-131059 (Year: 2007).*

* cited by examiner

*Primary Examiner* — Robert C Dye
(74) *Attorney, Agent, or Firm* — Birch, Stewart, Kolasch & Birch, LLP

(57) ABSTRACT

A heavy duty tire comprises a tread portion having circumferential grooves and land portions. The circumferential grooves include two shoulder circumferential grooves and a crown circumferential groove. The land portions include two of shoulder land portions and two crown land portions. The width W3 of the shoulder land portion is 17% to 28% of the tread width TW. The crown land portion is divided by crown shallow groove into crown blocks. The groove depth of the crown shallow groove is smaller than the groove depth of the crown circumferential groove. The groove bottom of the crown shallow groove is provided with a groove bottom sipe. The ground contacting top surface of the crown block is hexagonal, and the maximum circumferential dimension is 100% to 200% of the maximum axial dimension.

12 Claims, 8 Drawing Sheets

HEAVY DUTY TIRE

BACKGROUND OF THE INVENTION

Field of the Invention

The present disclosure relates to a heavy duty tire.

Background Art

Patent Document 1 below discloses a pneumatic tire used for heavy duty vehicles such as trucks and buses, wherein the tread portion is provided with three zigzag circumferential grooves, and thereby, four land portions extending in the tire circumferential direction are defined.

Patent Document 1: Japanese Patent Application Publication No. 2008-273306

SUMMARY OF THE INVENTION

Problems to be Solved by the Invention

In a heavy duty vehicle that repeats sudden starts and stops at short intervals under relatively large tire loads, such as a garbage truck, there is a problem such that uneven wear is liable to occur on the tread portions of the tires used.

The present disclosure was made in view of the above circumstances, and a primary objective of the present disclosure is to provide a heavy duty tire of which uneven wear resistance is improved.

Means for Solving the Problems

According to the present disclosure, a heavy duty tire comprises:
- a tread portion having tread edges and provided with circumferentially continuously extending circumferential grooves including a pair of shoulder circumferential grooves and a crown circumferential groove disposed therebetween, the tread portion axially divided by the circumferential grooves into land portions including a pair of shoulder land portions between the tread edges and the shoulder circumferential grooves and a pair of crown portions between the shoulder circumferential grooves and the crown circumferential groove, wherein
- the width in the tire axial direction of each of the shoulder land portions is 17% to 28% of the tread width between the tread edges,
- each of the crown land portions is circumferentially divided by a plurality of crown shallow grooves into a row of crown blocks,
- the groove depth of the crown shallow grooves is smaller than the groove depth of the crown circumferential groove,
- the bottom of each of the crown shallow grooves is provided with a groove bottom sipe,
- each of the crown blocks has a ground contacting top surface which has a maximum dimension in the tire axial direction and a maximum dimension in the tire circumferential direction which is 100% to 200% of the maximum dimension in the tire axial direction, and
- the ground contacting top surface has a hexagonal shape of which width measured in parallel to the tire axial direction is continuously increased from both ends in the tire circumferential direction toward the center therebetween.

Effects of the Invention

By adopting the above configuration, the heavy duty tire according to the present disclosure can be improved in uneven wear resistance.

DETAILED DESCRIPTION OF THE INVENTION

Embodiments of the present disclosure will now be described in detail in conjunction with accompanying drawings.

Heavy Duty Tire (First Embodiment)

Figure 1:
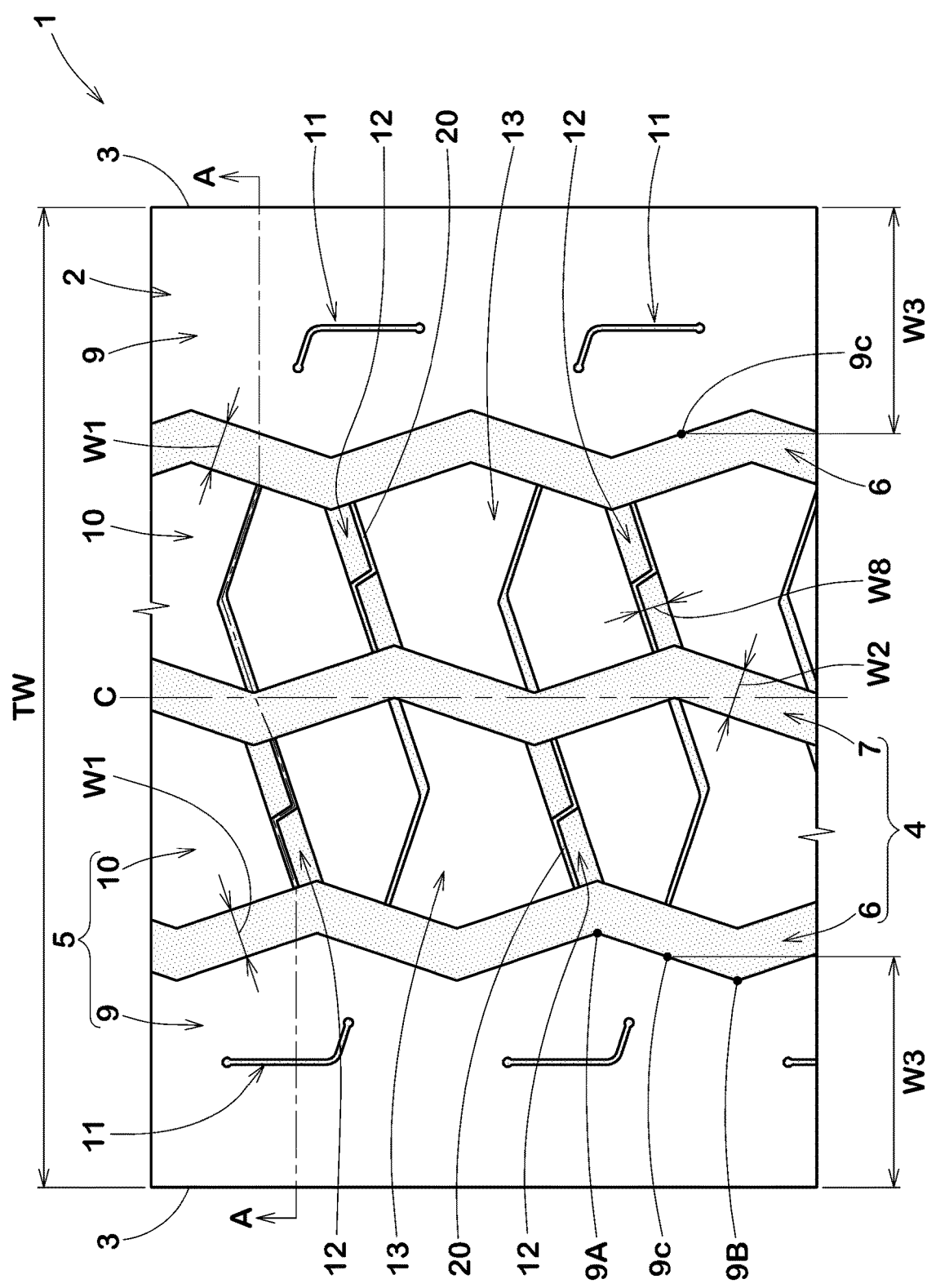
FIG. 1 is a developed partial view of the tread portion of a heavy duty tire as an embodiment of present disclosure.
Figure 2:
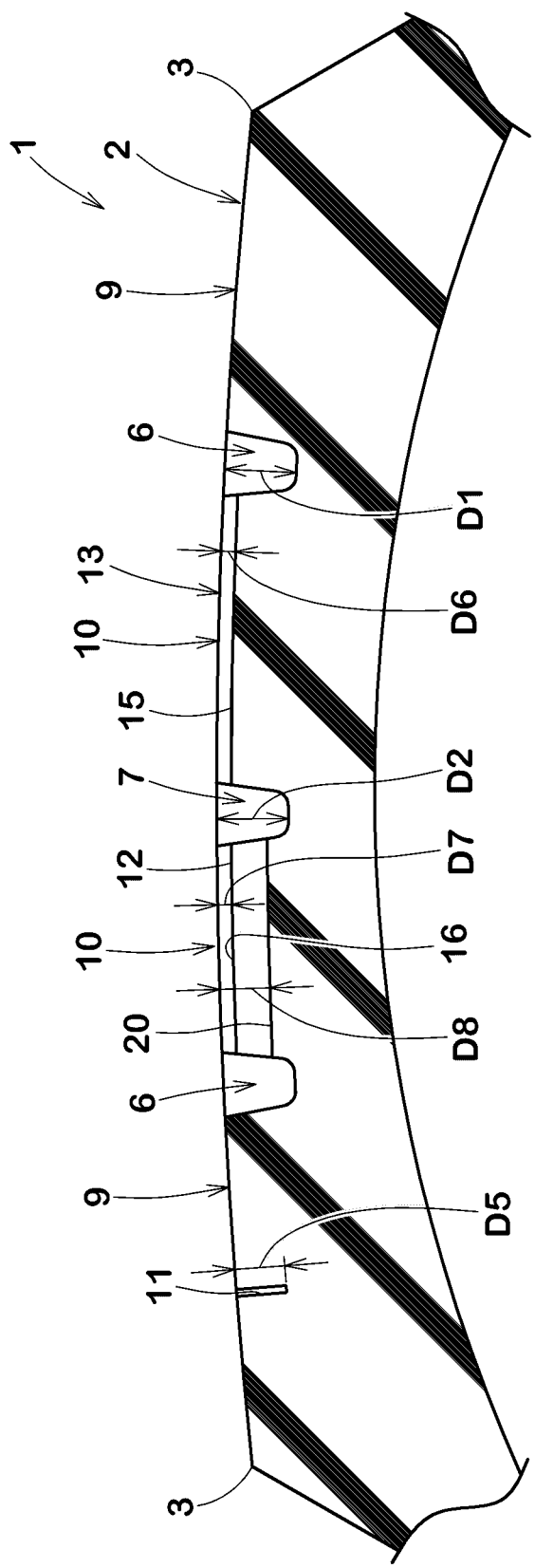
FIG. 2 is a cross-sectional view taken along line A-A of FIG. 1.

FIG. 1 shows a part of the tread portion 2 of a heavy duty tire 1 as an embodiment of present disclosure. FIG. 2 is a schematic cross-sectional view of the tread portion 2 taken along line A-A of FIG. 1.

In the present embodiment, the tire 1 is a pneumatic tire for heavy duty vehicles such as trucks and buses, particularly suitable for a garbage truck that repeats sudden starts and stops at short intervals under relatively large tire loads.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at Various Cold Inflation Pressures" table in TRA or the like.

The standard load is the "maximum load capacity" in JATMA, the "Load Capacity" in ETRTO, the maximum value given in the above-mentioned table in TRA or the like.

<Tread Edges>

The tread edges 3 are the axial outermost edges of the ground contacting patch of the tire which occurs under the normally inflated loaded condition when the tire 1 is placed on a flat horizontal surface at the camber angle of 0 degrees.

The tread width TW is the width measured under the normally inflated unloaded condition, as the axial distance between the tread edges 3 determined as above.

<Tread Portion>

The tread portion 2 is provided with a plurality of circumferential grooves 4 and thereby axially divided into a plurality of land portions 5.

The tread portion 2 is provided with a tread pattern. In the present embodiment, the tread pattern is point symmetrical with respect to an arbitrary point on the tire equator C. But, the present disclosure is not limited to such point symmetrical tread pattern, and the tread pattern may be a line symmetrical pattern, for example.

<Circumferential Grooves>

The circumferential grooves 4 are located between the tread edges 3, and extend continuously in the tire circumferential direction.

In the present embodiment, the circumferential grooves 4 include a pair of shoulder circumferential grooves 6, and at least one (in this example, only one) crown circumferential groove 7 disposed between the shoulder circumferential grooves 6.

<Shoulder Circumferential Grooves>

Figure 3:
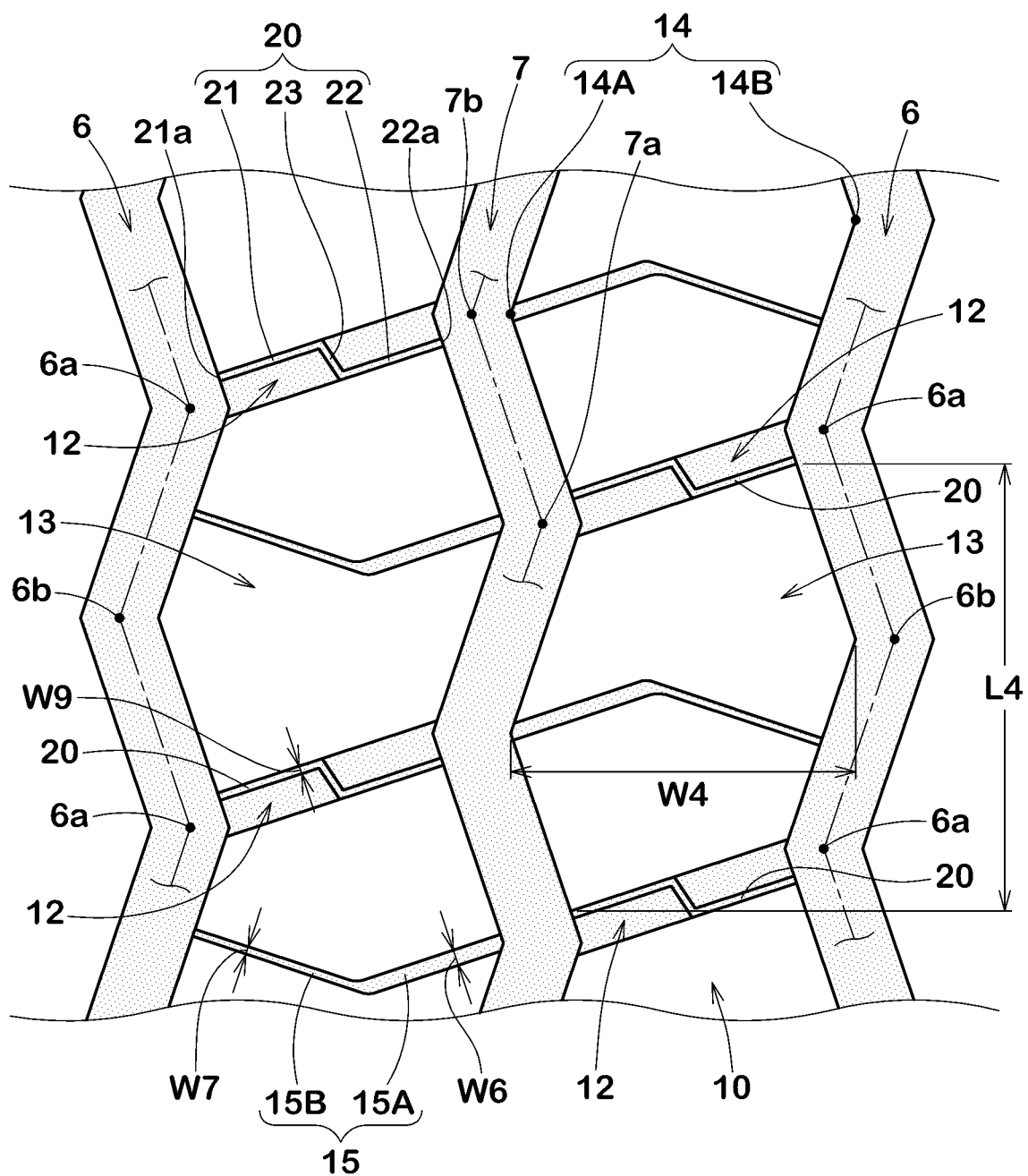
FIG. 3 is an enlarged view showing the shoulder circumferential grooves, the crown circumferential groove and the crown land portions shown in FIG. 1.

FIG. 3 shows the shoulder circumferential grooves 6, the crown circumferential groove 7 and the crown land portions 10 of FIG. 1.

Each of the shoulder circumferential grooves 6 of the present embodiment has axially inwardly projecting vertices 6a and axially outwardly projecting vertices 6b as shown in FIG. 3. The vertices 6a are alternated with the vertices 6b in the tire circumferential direction. Thereby, each shoulder circumferential groove 6 has a zigzag shape. In the shoulder circumferential grooves 6 of the present embodiment, the groove segments between the vertices 6a and 6b extend linearly.

Since the shoulder circumferential grooves 6 are zigzag, the groove edges are increased in the component in the axial direction, namely, the direction crossing the tire circumferential direction.

Further, in the present embodiment, as shown in FIG. 3, the zigzag phase of one of the shoulder circumferential grooves 6 is shifted, in the tire circumferential direction, from the zigzag phase of the other of the shoulder circumferential grooves 6.

Thereby, the shoulder circumferential grooves 6 can ensure the traction performance and braking performance of the tire.

The shoulder circumferential grooves 6 each have a groove width W1 (shown in FIG. 1) in a range from 3% to 10% of the tread width TW, and a groove depth D1 (shown in FIG. 2) in a range from 15 mm to 25 mm. Thereby, the shoulder circumferential grooves 6 bring out the wet performance, and the rigidity of the tread portion 2 is maintained.

<Crown Circumferential Groove>

As shown in FIG. 3, the crown circumferential groove 7 of the present embodiment has vertices 7a projecting toward one side in the tire axial direction, and vertices 7b projecting toward the other side in the tire axial direction.

The vertices 7a are alternated with the vertices 7b in the tire circumferential direction. Thereby, the crown circumferential groove 7 is formed in a zigzag shape.

In the crown circumferential groove 7 of the present embodiment, the groove segments between the vertices 7a and 7b extend linearly.

Since the crown circumferential groove 7 is zigzag, the groove edges are increased in the component in the axial direction, namely, the direction crossing the tire circumferential direction.

Further, as shown in FIG. 3, the zigzag phase of the crown circumferential groove 7 is shifted in the tire circumferential direction from the zigzag phase of each of the shoulder circumferential grooves 6.

Thereby, the crown circumferential groove 7 can further improve the traction performance and braking performance in cooperation with the shoulder circumferential grooves 6.

The crown circumferential groove 7 has a groove width W2 (shown in FIG. 1) in a range from 3% to 10% of the tread width TW, and a groove depth D2 (shown in FIG. 2) in a range from 15 mm to 25 mm.

Thereby, the crown circumferential groove 7 brings out the wet performance, while maintaining the rigidity of the tread portion 2.

<Land Portions>

The land portions 5 are divided by the circumferential grooves 4 as shown in FIG. 1. The land portions 5 include a pair of shoulder land portions 9 and a pair of crown land portions 10.

<Shoulder Land Portions>

The shoulder land portions 9 are defined between the tread edges 3 and the shoulder circumferential grooves 6.

In the present embodiment, each of the shoulder land portions 9 is not provided with lateral grooves and the like extending from the shoulder circumferential groove 6 to the tread edge 3. Thereby, the shoulder land portions 9 are each formed as a rib extending continuously in the tire circumferential direction.

Since the shoulder land portions 9 are formed as a rib as described above, their rigidity is sufficiently secured, so the deformation during braking, driving and turning is suppressed. Therefore, uneven wear of the shoulder land portions 9 such as shoulder wear can be suppressed.

Figure 4:
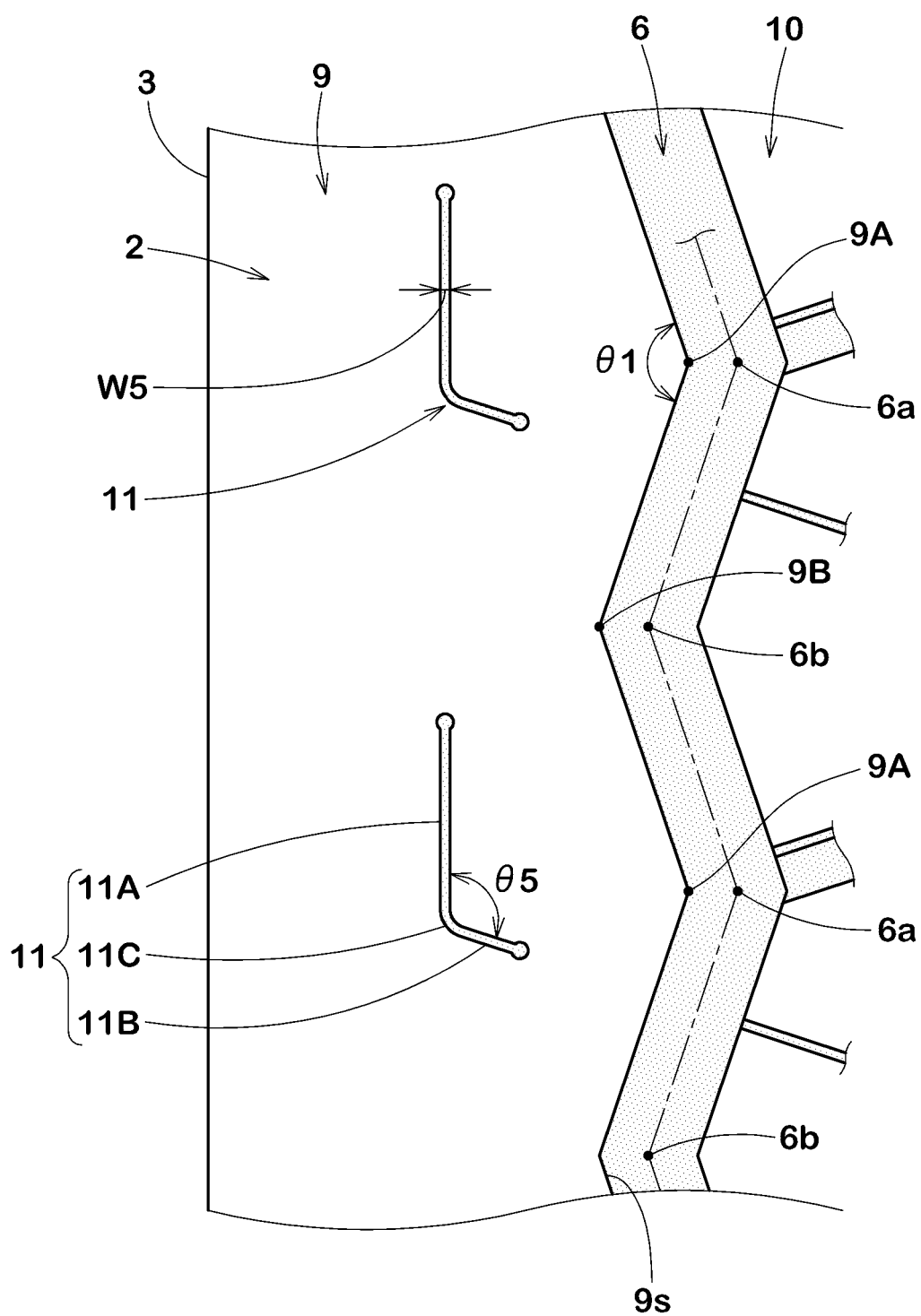
FIG. 4 is an enlarged view showing the shoulder circumferential groove and the shoulder land portion.

FIG. 4 shows a part of the shoulder circumferential groove 6 and a part of the shoulder land portion 9.

In the present embodiment, the axially inner edge 9s of the shoulder land portion 9 is formed by the zigzag-shaped shoulder circumferential groove 6, therefore, the axially inner edge 9s has axially inner corners 9A projecting axially inward and axially outer corners 9B projecting axially outward.

The axially inner corners 9A and the axially outer corners 9B are alternately arranged in the tire circumferential direction, and the axially inner edge 9s is formed in a zigzag shape. Thereby, the shoulder land portion 9 is provided with an edge component in the axial direction, namely, a direction crossing the tire circumferential direction, so the traction performance and the braking performance can be improved.

The inner angle θ1 of the axially inner corner 9A is set to be larger than 90 degrees. Thereby, the rigidity of the axially inner corner 9A is ensured, and it is possible to suppress the axially inner corner 9A from becoming a starting point of uneven wear. In order to effectively derive such advantageous effect, the internal angle θ1 is preferably set in a range from 120 to 160 degrees.

As shown in FIG. 1, the axial width W3 of the shoulder land portion 9 is preferably set in a range from 17% to 28% of the tread width TW.

When the edge 9s (shown in FIG. 4) of the shoulder land portion 9 is zigzag as in the present embodiment, the axial width W3 of the shoulder land portion 9 is defined by the axial distance between the tread edge 3 and the midpoint 9c in the tire axial direction between the axially inner corner 9A and the axially outer corner 9B.

When the edge 9s of the shoulder land portion 9 is linear and extends in the tire circumferential direction, the width W3 is defined by the maximum width of the shoulder land portion 9.

By setting the width W3 of each shoulder land portion 9 to 17% or more of the tread width TW, each shoulder land portion 9 can ensure sufficient rigidity. Thereby, in the tire 1 of the present embodiment, it is possible to reduce the deformation of the shoulder land portions 9 during braking, driving and turning, and thereby uneven wear of the shoulder land portions 9 such as shoulder wear can be suppressed.

By setting the width W3 to 25% or less of the tread width TW, the crown land portion 10 can secure a sufficient axial width (in this example, the maximum axial dimension W4 (shown in FIG. 3) of the crown block 13).

Accordingly, in the tire 1 of the present embodiment, the rigidity of the crown land portion 10 is sufficiently ensured, and uneven wear (heel and toe wear and the like) is suppressed. From such a point of view, the width W3 of each shoulder land portion 9 is preferably not less than 19% and preferably not more than 23% of the tread width TW.

<Shoulder Sipes>

As shown in FIG. 4, each of the shoulder land portions 9 is provided with shoulder sipes 11.

In the present embodiment, the shoulder sipe 11 comprises a first portion 11A extending in the tire circumferential direction, and a second portion 11B extending from one end of the first portion 11A while inclining to the axially inside of the tire.

The second portion 11B ends without reaching the shoulder circumferential groove 6.

By the first portion 11A and the second portion 11B, the shoulder sipe 11 has an L shape in its top view.

The shoulder sipes 11 are spaced apart from each other in the tire circumferential direction.

Such shoulder sipes 11 can enhance wet performance, while suppressing decrease in rigidity of the shoulder land portions 9 to suppress uneven wear of the shoulder land portion 9.

The angle θ5 formed between the first portion 11A and the second portion 11B is preferably an obtuse angle. Thereby, it is possible to alleviate strain, that tends to concentrate on the intersect portion 11C where the first portion 11A and the second portion 11B intersect, when the shoulder land portion 9 is deformed, and the intersect portion 11C is prevented from becoming a starting point of wear.

In order to effectively derive such advantageous effect, the angle θ5 is preferably set in a range from 95 to 120 degrees. Further, the intersect portion 11C is preferably formed in an arc shape.

The sipe width W5 of the shoulder sipe 11 is preferably not less than 1.0 mm, more preferably not less than 1.2 mm, but preferably not more than 2.0 mm, more preferably not more than 1.8 mm.

By setting the sipe width W5 to 2.0 mm or less, the rigidity of the shoulder land portion 9 is maintained, and thereby uneven wear is suppressed.

By setting the sipe width W5 to 1.0 mm or more, the wet performance is ensured.

As shown in FIG. 2, the depth D5 of the shoulder sipe 11 is preferably not less than 70%, more preferably not less than 75%, but preferably not more than 90%, more preferably not more than 85% of the groove depth D1 of the shoulder circumferential groove 6.

By setting the depth D5 to 90% or less of the groove depth D1, the rigidity of the shoulder land portion 9 is maintained, and uneven wear can be suppressed.

By setting the depth D5 to be 70% or more of the groove depth D1, wet performance can be exhibited from the early stage to the late stage of the tread wear life.

<Crown Land Portions>

As shown in FIG. 1, each of the crown land portions 10 is defined between the shoulder circumferential groove 6 and the crown circumferential groove 7.

Each of the crown land portions 10 is provided with crown shallow grooves 12, and thereby, circumferentially divided into crown blocks 13 in a circumferential row.

<Crown Blocks>

Each of the crown blocks 13 has a ground contacting top surface which has a maximum dimension W4 in the tire axial direction and a maximum dimension L4 in the tire circumferential direction as shown in FIG. 3. The maximum dimension L4 in the tire circumferential direction is not less than 100%, preferably not less than 130%, but not more than 200%, preferably not more than 150% of the maximum dimension W4 in the tire axial direction.

By setting the maximum dimension L4 to 100% or more of the maximum dimension W4, it is possible to secure the rigidity of the crown block 13 in the tire circumferential direction to suppress uneven wear (heel and toe wear).

By setting the maximum dimension L4 to 200% or less of the maximum dimension W4, it is possible to prevent the lateral rigidity of the crown block 13 from becoming insufficient. Thereby, the deformation of the crown block 13 during turning can be prevented from becoming large to suppress uneven wear such as abrasive wear.

Further, it is possible to prevent the crown shallow grooves 12 and the undermentioned groove bottom sipes 20 from becoming less or insufficient, and drainage performance is maintained.

Figure 5:
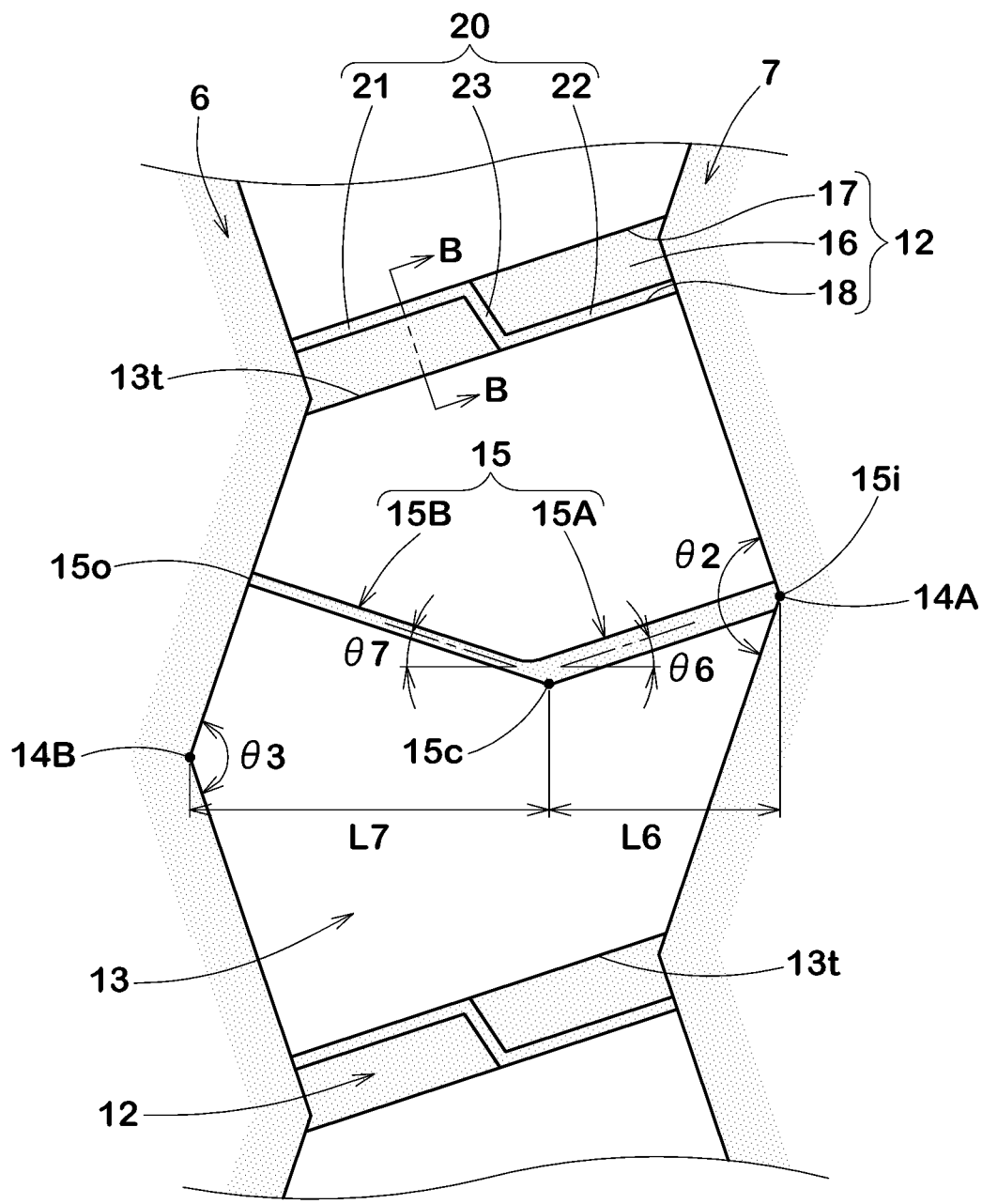
FIG. 5 is an enlarged view showing a part of the crown land portion divided into the crown blocks.

As shown in FIG. 5, the ground contacting top surface of each of the crown blocks 13 is formed in a hexagonal shape of which width measured in the tire axial direction increases continuously from its circumferential ends toward the center in the tire circumferential direction.

Such crown block 13 gradually increases its lateral rigidity from the circumferential ends toward the center. As a result, deformation of the crown block 13 during turning is reduced, and uneven wear of the crown block 13 can be suppressed.

As shown in FIG. 3, the ground contacting top surface of the crown block 13 has corners 14 projecting outward of the crown block and positioned between the adjacent two crown shallow grooves 12.

The corners 14 include an axially inner corner 14A on the crown circumferential groove 7 side and an axially outer corner 14B on the shoulder circumferential groove 6 side.

As shown in FIG. 5, the inner angle $\theta 2$ of the axially inner corner 14A and the inner angle $\theta 3$ of the axially outer corner 14B are set to be larger than 90 degrees, that is, the angles $\theta 2$ and $\theta 3$ are obtuse angles, to ensure their rigidity, and thereby, to prevent the axially inner corner 14A and the axially outer corner 14B from becoming the starting points of uneven wear.

In order to effectively derive such advantageous effect, it is preferred that the inner angles $\theta 2$ and $\theta 3$ are set in a range from 120 to 160 degrees.

<Crown Sipes>

The crown blocks 13 are each provided with a crown sipe 15.

The crown sipe 15 provides edges to the ground contacting top surface of the crown block 13, and thereby, the traction performance and braking performance can be improved. Further, the crown sipe 15 in this example facilitates drainage of water existing between the tread surface and the road surface.

As shown in FIG. 2, the depth D6 of the crown sipe 15 is preferably not less than 10%, more preferably not less than 12%, but preferably not more than 20%, more preferably not more than 18% of the groove depth D2 of the crown circumferential groove 7.

By setting the depth D6 to 20% or less of the groove depth D2, the rigidity of the crown block 13 can be ensured, and uneven wear resistance can be maintained.

By setting the depth D6 to 10% or more of the groove depth D2, it is possible to discharge the water, while providing the ground contacting top surface of the crown block 13 with effective sipe edges.

The crown sipe 15 extends across the crown blocks 13 generally in the tire axial direction.

The axial inner end 15*i* of the crown sipe 15 is positioned at the axially inner corner 14A as shown in FIG. 5. Thereby, the axially inner corner 14A where the ground contact pressure becomes relatively high during braking and driving, can be prevented from increasing in rigidity more than necessary. As a result, the force (ground contact pressure) acting on the crown block 13 can be prevented from concentrating on the axially inner corner 14A, and thereby, the axially inner corner 14A is prevented from becoming a starting point of uneven wear.

The axially outer end 15*o* of the crown sipe 15 is positioned between the axially outer corner 14B and one of the adjacent two crown shallow grooves 12. Thereby, the axially outer corner 14B where the ground contact pressure is relatively high during turning secures rigidity and can be prevented from becoming a starting point of uneven wear.

The crown sipe 15 comprises a first portion 15A and a second portion 15B. The first portion 15A extends axially outwardly from the axial inner end 15*i* of the crown sipe 15. The second portion 15B extends axially inwardly from the axially outer end 15*o* of the crown sipe 15. The first portion 15A and the second portion 15B are inclined with respect to the tire axial direction. The first portion 15A and the second portion 15B are connected to each other via an bending position 15*c*. Thereby, the crown sipe 15 is formed in a V shape.

Such edges of the first portion 15A and the second portion 15B can provide an axial edge component and a circumferential edge component to the ground contacting top surface of the crown block 13 to improve the traction performance and the braking performance.

Further, as compared to a sipe (not shown) extending straight in parallel to the tire axial direction, the crown sipe 15 which is bent, can suppress the deformation of the crown block 13 during braking and driving, and thereby suppress the uneven wear (heel-and-toe wear and the like).

In order to effectively derive such advantageous effect, it is preferred that the angle $\theta 6$ of the first portion 15A with respect to the tire axial direction and the angle $\theta 7$ of the second portion 15B with respect to the tire axial direction are set in a range from 10 to 30 degrees.

As shown in FIG. 3, the sipe width W6 of the first portion 15A may be set larger than the sipe width W7 of the second portion 15B. Thereby, the first portion 15A can prevent the rigidity from increasing more than necessary on the side of the axially inner corner 14A where the ground contact pressure during braking and driving is relatively high. Therefore, it is possible to prevent the force (ground contact pressure) acting on the crown block 13 from concentrating on the axially inner corner 14A, and the axially inner corner 14A can be prevented from becoming a starting point of uneven wear.

On the other hand, since the sipe width W7 of the second portion 15B is smaller than the width W6 of the first portion 15A, the rigidity is secured on the side of the axially outer corner 14B where the ground contact pressure is relatively high during turning. As a result, it is possible to prevent the axially outer corner 14B from becoming a starting point of uneven wear.

In order to effectively derive such advantageous effect, it is preferred that the width W6 of the first portion 15A is in a range from 150% to 250% of the sipe width W7 of the second portion 15B. The sipe width W7 of the second portion 15B is preferably set in the same range as the sipe width W5 (shown in FIG. 4) of the shoulder sipe 11.

As shown in FIG. 5, the axial length L7 of the second portion 15B is preferably larger than the axial length L6 of the first portion 15A. As a result, the rigidity of the crown block 13 on the side of the axially outer corner 14B is set to be relatively large, and thereby, the axially outer corner 14B is prevented from becoming a starting point of uneven wear.

In order to effectively derive such advantageous effect, the axial length L7 is preferably set in a range from 130% to 170% of the axial length L6.

<Crown Shallow Grooves>

As shown in FIG. 3, both ends of the crown shallow groove 12 are respectively connected to one of the vertices 6*a* of one of the shoulder circumferential grooves 6 projecting axially inwardly, and one of the vertices 7*a*, 7*b* of the crown circumferential groove 7 projecting toward the above-said one of the shoulder circumferential grooves 6. At the vertices 6*a* and 7*a* of the shoulder circumferential grooves 6 and the crown circumferential groove 7, the force of water flowing in the grooves increases. By connecting the crown shallow grooves 12 to those vertices, the water in the grooves can be smoothly guided, and wet performance can be improved.

It is preferable that the crown shallow groove 12 extends linearly. As a result, the crown shallow groove 12 can smoothly discharge the water in the groove and improve the wet performance.

Figure 6:
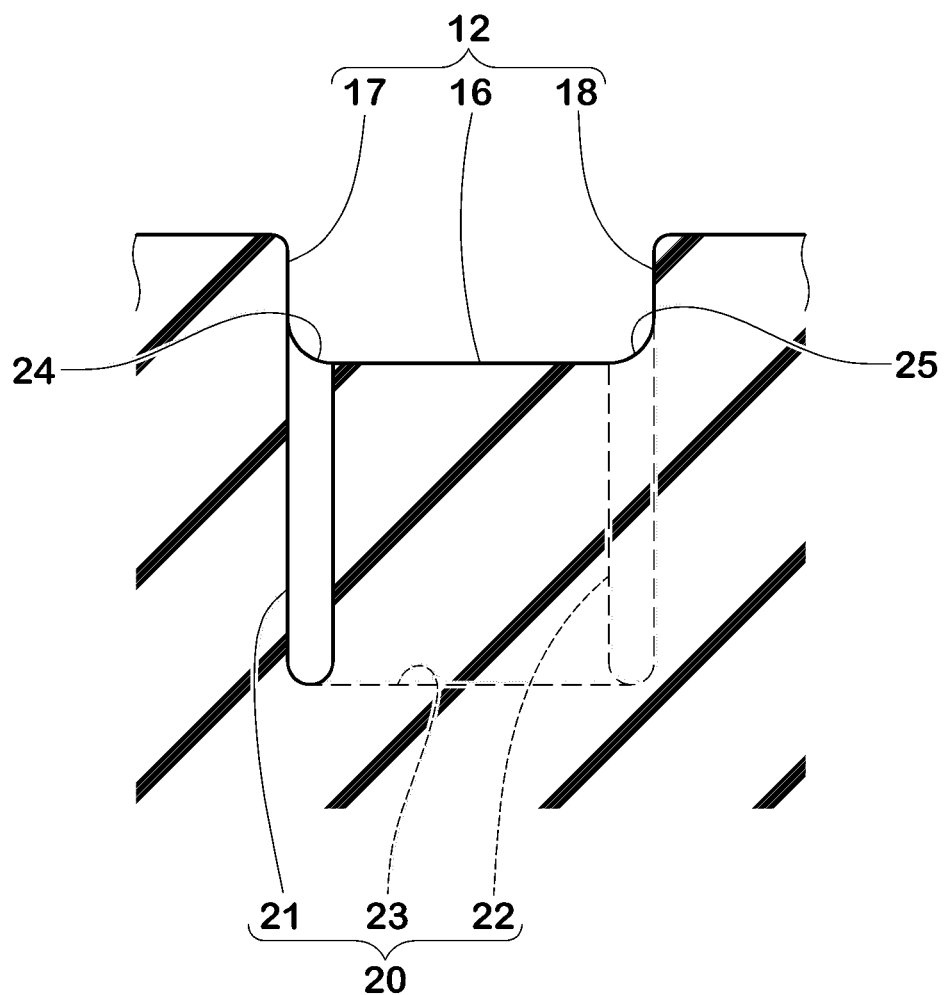
FIG. 6 is a cross-sectional view taken along line B-B of FIG. 5.

FIG. 6 is a cross-sectional view taken along line B-B in FIG. 5.

The crown shallow groove 12 has a groove bottom 16, a first groove wall 17, and a second groove wall 18.

As shown in FIG. 2, the groove depth D7 of the crown shallow groove 12 is set to be smaller than the groove depth D2 of the crown circumferential groove 7. Thereby, the rigidity of the crown land portion 10 can be secured, and uneven wear is suppressed.

The groove depth D7 of the crown shallow groove 12 is preferably not less than 10%, more preferably not less than 12%, but preferably not more than 20%, more preferably not more than 18% of the groove depth D2 of the crown circumferential groove 7.

By setting the groove depth D7 to 20% or less of the groove depth D2, the rigidity of the crown land portion 10 can be secured, and uneven wear resistance can be maintained.

By setting the groove depth D7 to 10% or more of the groove depth D2, wet performance can be maintained.

From the same point of view, the groove width W8 (shown in FIG. 1) of the crown shallow groove 12 is preferably set in a range from 2% to 5% of the tread width TW.

Figure 7:
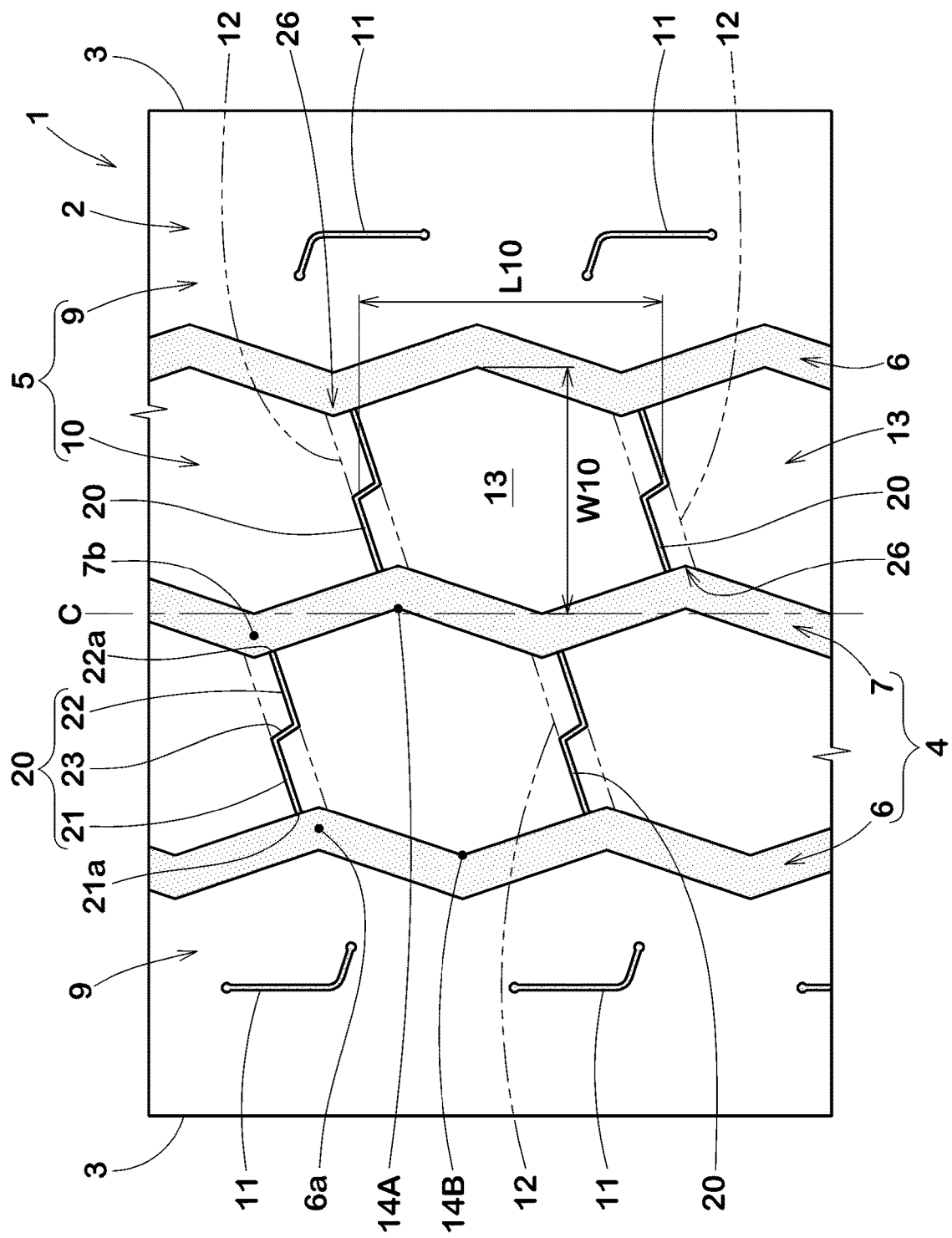
FIG. 7 is a developed partial view of the tread portion showing its worn state.

FIG. 7 is a developed partial view of the tread portion 2 showing its worn state where the groove depth of the crown circumferential groove 7 is decreased to about 20% to 40% of the original groove depth D2 as a result of the wear of the tread rubber.

As shown, the crown shallow grooves 12 (indicated by a chain double-dashed line) disappear earlier than the crown circumferential groove 7, and each crown land portion 10 becomes a rib-like portion substantially continuous in the tire circumferential direction, therefore, the deformation during braking and driving is suppressed.

As a result, in the tire 1 of the present embodiment, uneven wear (heel-and-toe wear) in the crown land portions 10 which tends to occur as wear progresses, can be suppressed.

<Groove Bottom Sipes>

As shown in FIGS. 1 and 2, the groove bottom 16 of each of the crown shallow grooves 12 is provided with a groove bottom sipe 20.

In the present embodiment, as shown in FIG. 1, the groove bottom sipe 20 is connected to the crown circumferential groove 7 and one of the shoulder circumferential grooves 6.

The groove bottom sipe 20 can prevent the rigidity of the crown land portion 10 from increasing more than necessary while ensuring wet performance.

As a result, the groove bottom sipe 20 can prevent partial concentration of force acting on the crown land portion 10 during braking and driving, thereby suppressing uneven wear.

As shown in FIG. 7, the groove bottom sipes 20 remain even after the crown shallow grooves 12 disappear, so wet performance is maintained.

Further, after the crown shallow grooves 12 disappear, the crown blocks 13 adjacent to each other in the tire circumferential direction can support each other through the groove bottom sipes 20. Thereby, the rigidity of the crown land portion 10 can be maintained, and uneven wear is suppressed.

In the tire 1 of the present embodiment, the groove bottom sipes 20 are provided as described above, and the groove depth D7 of the crown shallow grooves 12 is smaller than the groove depth D2 of the crown circumferential groove 7. As a result, uneven wear of the crown land portions 10 of the tire 1 is effectively suppressed.

Further, in the tire 1 of the present embodiment, the width W3 of each shoulder land portion 9 is limited to the range described above, and the ground contacting top surface of each of the crown blocks 13 is configured as described above. As a result, the deformation of the shoulder land portions 9 and the crown blocks 13 of the tire 1 can be reduced, and uneven wear thereof is suppressed.

Therefore, the tire 1 of the present embodiment can be improved in uneven wear resistance.

As shown in FIG. 3, the width W9 of the groove bottom sipe 20 is preferably not less than 1.0 mm, more preferably not less than 1.2 mm, but preferably not more than 2.0 mm, more preferably not more than 1.8 mm.

By setting the width W9 to 2.0 mm or less, the rigidity of the crown land portion 10 is maintained, thereby suppressing uneven wear.

By setting the width W9 to 1.0 mm or more, wet performance and traction performance are ensured.

As shown in FIG. 2, the maximum depth D8 of the groove bottom sipe 20 is preferably not less than 70%, but preferably not more than 90% of the groove depth D2 of the crown circumferential groove 7.

By setting the maximum depth D8 to 70% or more of the groove depth D2, wet performance and traction performance can be exhibited while preventing uneven wear of the crown land portions 10 from the early stage to the late stage of wear.

If the maximum depth D8 is more than 90% of the groove depth D2, the rigidity of the crown land portion 10 is liable to become insufficient, and uneven wear tends to occur.

As shown in FIGS. 3 and 5, in the present embodiment, the groove bottom sipe 20 is composed of a first portion 21, a second portion 22 and a third portion 23.

The first portion 21 is positioned at a first corner 24 between the groove bottom 16 and the first groove wall 17 of the crown shallow groove 12 as shown in FIG. 6, and extends in parallel with the longitudinal direction of the crown shallow groove 12 as shown in FIG. 5.

The second portion 22 is positioned at a second corner 25 between the groove bottom 16 and the second groove wall 18 of the crown shallow groove 12 as shown in FIG. 6, and extends in parallel with the longitudinal direction of the crown shallow groove 12 as shown in FIG. 5.

The third portion 23 connects one end of the first portion 21 and one end of the second portion 22 as shown in FIG. 5, therefore, the groove bottom sipe 20 has a crank shape in its top view.

As shown in FIG. 7, after the crown shallow grooves 12 disappear, the groove bottom sipes 20 allow the crown blocks 13 adjacent to each other in the tire circumferential direction to support each other when they are subjected to forces in the tire circumferential direction and tire axial direction. As a result, deformation of the crown blocks 13 is suppressed, so uneven wear such as abrasive wear thereof can be suppressed.

It is preferable that, as shown in FIG. 3, the other end 21a of the first portion 21 is connected to the shoulder circumferential groove 6 at a position other than those of the zigzag vertices 6a and 6b.

Here, being connected to a position other than those of the zigzag vertices 6a and 6b means that the zigzag vertices 6a and 6b do not exist on the extension line from the other end 21a of the first portion 21.

In the present embodiment, after the crown shallow grooves 12 disappear as shown in FIG. 7, the groove bottom sipes 20 can prevent the axially outer corners 14B and constrictions 26 of the crown land portion 10 formed by the vertices 6*a* and 6*b*, from being lowered in rigidity. Thereby, the rigidity of the crown land portion 10 (crown blocks 13) is ensured, so uneven wear thereof is suppressed.

From the same point of view, it is preferable that the other end 22*a* of the second portion 22 is connected to the crown circumferential groove 7 at a position other than the vertices 7*a* and 7*b*.

In the present embodiment, the groove bottom sipe 20 is formed in a crank shape. But, the groove bottom sipe 20 is not limited to such a shape.

For example, it may be formed in an S shape by forming at least a portion of the first portion 21, the second portion 22 and the third portion 23 as an arc shape.

After the crown shallow grooves 12 disappear as shown in FIG. 7, it is preferable that the ground contacting top surface of each crown block 13 has a maximum dimension W10 in the tire axial direction, and a maximum dimension L10 in the tire circumferential direction which is not less than 104%, preferably not less than 140%, but not more than 160%, preferably not more than 150% of the maximum dimension W10 in the tire axial direction.

By setting the maximum dimension L10 to 104% or more of the maximum dimension W10, the rigidity of the crown block 13 in the tire circumferential direction can be ensured, and uneven wear (heel and toe wear) can be suppressed.

By setting the maximum dimension L10 to 160% or less of the maximum dimension W10, it is possible to prevent the lateral rigidity of the crown block 13 from becoming insufficient, thereby suppressing uneven wear such as abrasive wear.

Further, since it is possible to prevent the number of the crown sipes 15 from decreasing, the drainage performance is maintained.

Heavy Duty Tire (Second Embodiment)

In the above-described embodiment, the crown sipe 15 traverses the crown block 13 generally in the tire axial direction. But, the crown sipe 15 is not limited to such configuration.

Figure 8:
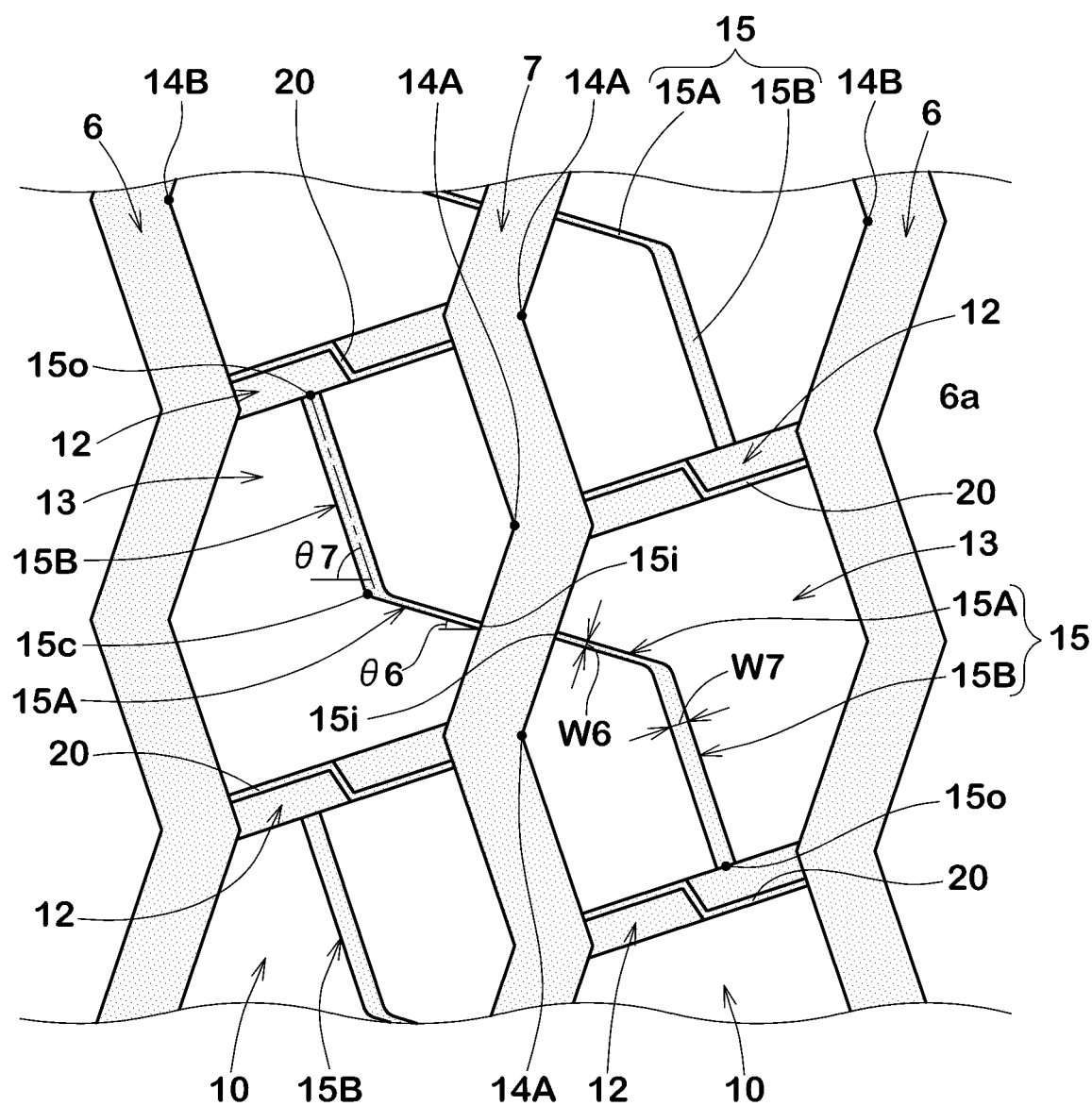
FIG. 8 is an enlarged view of the tread portion of a heavy duty tire as another embodiment of the present disclosure.

FIG. 8 shows a part of the tread portion 2 of another embodiment of the present disclosure. The components of the present embodiment which are the same as those of the previous embodiment are assigned by the same reference numerals, and the redundant descriptions will be omitted.

Crown Sipes (Second Embodiment)

In the present embodiment, the crown sipe 15 has an axially inner end 15*i* which is connected to the crown circumferential groove 7. Thereby, the crown sipe 15 can smoothly discharge water between the tread surface and the road surface.

The axially inner end 15*i* of the crown sipe 15 in this example is connected to a position between the axially inner corner 14A and the crown shallow groove 12.

As a result, the crown block 13 can secure the rigidity of the axially inner corner 14A where the ground contact pressure becomes relatively high during braking and driving, thereby preventing the axially inner corner 14A from becoming a starting point of uneven wear.

The crown sipe 15 has an axially outer end 15*o* connected to one of the crown shallow grooves 12. As a result, the crown block 13 can secure the rigidity of the axially outer corner 14B where the ground contact pressure is relatively high during turning, thereby preventing the axially outer corner 14B from becoming a starting point of uneven wear.

In the present embodiment, the crown sipe 15 is composed of a first portion 15A and a second portion 15B.

The first portion 15A extends axially outwardly from the axially inner end 15*i* of the crown sipe 15. The second portion 15B extends axially inwardly from the axially outer end 15*o* of the crown sipe 15. The first portion 15A and the second portion 15B are inclined with respect to the tire axial direction.

The first portion 15A and the second portion 15B are connected to each other at a bending position 15*c*. As a result, the crown sipe 15 has a V shape in its top view.

Thereby, the crown sipe 15 in the present embodiment can ensure traction performance and braking performance, like the crown sipe 15 in the previous embodiment.

The crown sipe 15 in the present embodiment can prevent the deformation of the crown block 13 during braking and driving from becoming large compared to a sipe (not shown) extending parallel to the tire axial direction. Thus, it is possible to suppress uneven wear (heel-and-toe wear) and the like.

Further, the angle $\theta 7$ of the second portion 15B with respect to the tire axial direction is set larger than the angle $\theta 6$ of the first portion 15A with respect to the tire axial direction. As a result, the second portion 15B can ensure rigidity of the axially outer corner 14B where the ground contact pressure is relatively large during turning. As a result, it is possible to prevent the axially outer corner 14B from becoming a starting point of uneven wear.

In order to effectively derive such advantageous effect, the angle $\theta 6$ of the first portion 15A with respect to the tire axial direction is preferably 10 to 30 degrees, and the angle $\theta 7$ of the second portion 15B with respect to the tire axial direction is preferably 50 to 70 degrees.

The width W6 of the first portion 15A may be set smaller than the sipe width W7 of the second portion 15B. As a result, the first portion 15A can secure the rigidity of the axially inner corner 14A where the ground contact pressure is relatively high during braking and driving, and can prevent the axially inner corner 14A from becoming a starting point of uneven wear.

On the other hand, since the width W7 of the second portion 15B is set larger than the width W6 of the first portion 15A, water between the tread surface and the road surface can be smoothly discharged in the vicinity of the outer corner 14B where the ground contact pressure is relatively high during turning.

In order to effectively derive such advantageous effect, the width W6 of the first portion 15A is preferably set in a range from 40% to 70% of the sipe width W7 of the second portion 15B.

In the present embodiment, the groove center lines (not shown) of two of the first portions 15A adjacent to each other across the crown circumferential groove 7 are arranged on one straight line. As a result, the two first portions 15A can form a large edge component in the direction crossing the tire circumferential direction in the vicinity of the tire equator C where the ground contact pressure is relatively high during braking and driving. Thereby, the traction performance and braking performance can be improved.

While detailed description has been made of preferable embodiments of the present disclosure, the present disclosure can be embodied in various forms without being limited to the illustrated embodiments.

Comparison Tests
<<Mode A>>

Based on the tread pattern shown in FIG. 1, heavy-duty tires having specifications listed in Table 1 were experimentally manufactured as test tires (working examples Ex. 1 to Ex. 6 and comparative examples Ref. 1 to Ref. 4), and tested for uneven wear resistance and wet performance.

In the comparative example Ref. 4, crown blocks thereof were configured to have the same shape as the crown blocks of Patent Document 1.

Common specifications to all the test tires are as follows.
Tire size: 315/80R22.5
Rim size: 9×22.5
Tire inflation pressure: 900 kPa
Tire Load: 4000 kg
Tread width TW: 280 mm
Test vehicle: Garbage truck
Shoulder Circumferential Grooves
    Groove width W1: 5% of Tread width TW
    Groove depth D1: 20.1 mm
Crown Circumferential Groove
    Groove width W2: 5% of Tread width TW
    Groove depth D2: 20.1 mm
Shoulder Land Portions
    Inner angle θ1 of Axially inner corner: 140 degrees
Crown Blocks
    Maximum dimension L4 in tire circumferential direction: 85 mm
    Inner angle θ2 of Axially inner corner: 140 degrees
    Inner angle θ3 of Axially outer corner: 140 degrees
Crown Shallow Grooves
    Groove depth D7: 13.4% of Groove depth D2
    Groove width W8: 3.1% of Tread width TW
Shoulder Sipes
    Width W5: 1.5 mm
    Depth D5: 80% of Groove depth D1
Crown Sipes
    Depth D6: 15% of Groove depth D2
    First portion width W6: 200% of Second portion width W7
    Second portion length L7: 150% of First portion length L6
    First portion angle θ6: 20 degrees
    Second portion angle θ7: 20 degrees
Groove Bottom Sipe:
    width W9: 1.5 mm
    Maximum depth D8: 80% of Groove depth D2
Test methods are as follows.

<Uneven Wear Resistance>

Each test tire mounted on the above-mentioned rim and inflated to the above-mentioned pressure, was installed on all wheels of the above test vehicle.

After running for six months without tire rotation, uneven wear (heel and toe wear) of the crown land portions, and uneven wear (shoulder drop wear) of the shoulder land portions were visually inspected and evaluated.

The evaluation results are indicated in Table 1 by an index based on the working example Ex. 1 being 100, wherein the larger the value, the better the uneven wear resistance.

<Wet Performance>

Each test tire mounted on the above-mentioned rim and inflated to the above-mentioned pressure, was installed on all wheels of the above test vehicle.

Then, the braking distance was measured when the test vehicle running on a wet paved road surface at 80 km/h was suddenly braked.

The results are indicated in Table 1 by an index based on the working example Ex. 1 being 100, wherein the larger the number, the better the wet performance. When the index is 95 or higher, the wet performance is considered as being maintained.

TABLE 1

| Tire | Ref. 1 | Ex. 1 | Ex. 2 | Ex. 3 | Ref. 2 |
|---|---|---|---|---|---|
| W3/TW (%) | 15 | 17 | 23 | 28 | 30 |
| L4/W4 (%) | 142 | 142 | 142 | 142 | 142 |
| Crown block shape | hexagon | hexagon | hexagon | hexagon | hexagon |
| Uneven wear resistance | | | | | |
| Shoulder land portions | 93 | 100 | 105 | 106 | 106 |
| Crown land portions | 101 | 100 | 99 | 97 | 91 |
| Wet performance | 100 | 100 | 100 | 100 | 100 |

| Tire | Ref. 3 | Ex. 4 | Ex. 5 | Ex. 6 | Ref. 4 |
|---|---|---|---|---|---|
| W3/TW (%) | 23 | 23 | 23 | 23 | 23 |
| L4/W4 (%) | 90 | 100 | 150 | 200 | 142 |
| Crown block shape | hexagon | hexagon | hexagon | hexagon | dodecagon |
| Uneven wear resistance | | | | | |
| Shoulder land portions | 100 | 100 | 100 | 100 | 105 |
| Crown land portions | 91 | 97 | 101 | 103 | 92 |
| Wet performance | 103 | 102 | 99 | 98 | 100 |

From the test results, it was confirmed that, as compared to the comparative examples, the working examples were improved in the uneven wear resistance while maintaining the wet performance.

<<Mode B>>

Based on the tread pattern shown in FIG. 1, heavy-duty tires having specifications listed in Table 2 were experimentally manufactured as test tires (working examples Ex. 7 to Ex. 14), and tested for uneven wear resistance and wet performance.

Common specifications were the same as those of Mode A except for the following specifications and specifications listed in Table 2.
Shoulder Land Portions
    Width W3: 23% of Tread width TW
Crown Blocks
    Maximum dimension L4: 142% of Maximum dimension W4
    Shape: Hexagon Test methods are the same as described above, and the test results are indicated in Table 2. In Table 2, the working example Ex. 2 is added as a reference.

TABLE 2

| Tire | Ex. 7 | Ex. 8 | Ex. 2 | Ex. 9 | Ex. 10 | Ex. 11 | Ex. 12 | Ex. 13 | Ex. 14 |
|---|---|---|---|---|---|---|---|---|---|
| D7/D2 (%) | 8 | 10 | 13.4 | 20 | 22 | 13.4 | 13.4 | 13.4 | 13.4 |
| W9 (mm) | 1.5 | 1.5 | 1.5 | 1.5 | 1.5 | 0.8 | 1.0 | 2.0 | 2.1 |
| Uneven wear resistance | | | | | | | | | |
| Shoulder land portions | 105 | 105 | 105 | 105 | 105 | 105 | 105 | 105 | 105 |
| Crown land portions | 101 | 100 | 99 | 98 | 96 | 103 | 102 | 98 | 96 |
| Wet performance | 97 | 99 | 100 | 101 | 102 | 97 | 98 | 102 | 103 |

From the test results, it was confirmed that the working examples in which the groove depth D7 of the crown shallow groove and the width W9 of the groove bottom sipe were within the respective preferable ranges were improved in the uneven wear resistance while maintaining the wet performance, as compared to the working examples in which the groove depth D7 and the width W9 were outside the respective preferable ranges.

<<Mode C>>

Based on the tread pattern shown in FIG. 1, heavy-duty tires having specifications listed in Table 3 were experimentally manufactured as test tires (working examples Ex. 15 to Ex. 22), and tested for uneven wear resistance and wet performance.

Common specifications were the same as those of Mode A except for the following specifications and specifications listed in Table 3.

Shoulder Land Portions
  Width W3: 23% of Tread width TW
Crown Blocks
  Maximum dimension L4: 142% of Maximum dimension W4
  Shape: Hexagon Test methods are the same as described above, and the test results are indicated in Table 3. In Table 3, the working example Ex. 2 is added as a reference.

TABLE 3

| Tire | Ex. 15 | Ex. 16 | Ex. 2 | Ex. 17 | Ex. 18 | Ex. 19 | Ex. 20 | Ex. 21 | Ex. 22 |
|---|---|---|---|---|---|---|---|---|---|
| D8/D2 (%) | 60 | 70 | 80 | 90 | 95 | 80 | 80 | 80 | 80 |
| D6/D2 (%) | 15 | 15 | 15 | 15 | 15 | 5 | 10 | 20 | 25 |
| Uneven wear resistance | | | | | | | | | |
| Shoulder land portions | 105 | 105 | 105 | 105 | 105 | 105 | 105 | 105 | 105 |
| Crown land portions | 102 | 100 | 99 | 98 | 96 | 103 | 101 | 98 | 96 |
| Wet performance | 96 | 99 | 100 | 101 | 103 | 97 | 99 | 101 | 102 |

From the test results, it was confirmed that the working examples in which the maximum depth D8 of the groove bottom sipe and the depth D6 of the crown sipe were within the respective preferable ranges. were improved in the uneven wear resistance while maintaining the wet performance, as compared to the working examples in which the maximum depth D8 and the depth D6 were outside the respective preferable ranges.

Statement of the Present Disclosure

The present disclosure is as follows:

Disclosure 1: A heavy duty tire comprising:
  a tread portion having tread edges and comprising land portions axially divided by circumferential grooves extending continuously in the tire circumferential direction, the circumferential grooves include a pair of shoulder circumferential grooves and at least one crown circumferential groove disposed therebetween,
  the land portions include a pair of shoulder land portions defined between the tread edges and the shoulder circumferential grooves, and a pair of crown land portions defined between the shoulder circumferential grooves and the crown circumferential groove,
  the axial width of each of the shoulder land portions is 17% to 28% of the tread width between the tread edges,
  each of the crown land portions is circumferentially divided by crown shallow grooves into a row of crown blocks,
  the groove depth of each of the crown shallow grooves is smaller than the groove depth of the crown circumferential groove,
  the groove bottom of each of the crown shallow grooves is provided with a groove bottom sipe,
  each of the crown blocks has a ground contacting top surface which has a maximum dimension in the tire axial direction and a maximum dimension in the tire circumferential direction which is 100% to 200% of the maximum dimension in the tire axial direction, and
  the ground contacting top surface of each of the crown blocks has a hexagonal shape of which width measured in the tire axial direction increases continuously from both ends in the tire circumferential direction toward the center therebetween.

Disclosure 2: The heavy duty tire according to Disclosure 1, wherein
  the groove depths of the crown shallow grooves are in a range from 10% to 20% of the groove depth of the crown circumferential groove.

Disclosure 3: The heavy duty tire according to Disclosure 1 or 2, wherein
  each of the crown shallow grooves is a straight groove.

Disclosure 4: The heavy duty tire according to Disclosure 1, 2 or 3, wherein
  each of the shoulder circumferential grooves is a zigzag groove having axially inwardly projecting vertices (6a) and axially outwardly projecting vertices (6b),
  the crown circumferential groove is a zigzag groove having vertices (7a) projecting toward one of the shoulder circumferential grooves, and vertices (7b) projecting toward the other of the shoulder circumferential grooves, and
  each of the crown shallow grooves is connected to one of the axially inwardly projecting vertices (6a) of one of the shoulder circumferential grooves, and one of the vertices (7a) of the crown circumferential groove projecting toward said one of the shoulder circumferential grooves.

Disclosure 5: The heavy duty tire according to any one of Disclosures 1 to 4, wherein
  the ground contacting top surface of each of the crown blocks is provided with a crown sipe.

Disclosure 6: The heavy duty tire according to Disclosure 5, wherein
  the crown sipe traverses said ground contacting top surface in the tire axial direction.

Disclosure 7: The heavy duty tire according to Disclosure 6, wherein
  the ground contacting top surface of each of the crown blocks has
  an axially inner corner protruding toward the crown circumferential groove, and an axially outer corner protruding toward the adjacent shoulder circumferential groove, and the crown sipe has an axially inner end connected to the axially inner corner.

Disclosure 8: The heavy duty tire according to Disclosure 7, wherein
the crown sipe has an axially outer end connected to the shoulder circumferential grooves at a position between the axially outer corner and one of the crown shallow grooves.

Disclosure 9: The heavy duty tire according to Disclosure 8, wherein
each of the crown sipes comprises a first portion extending axially outward from the axially inner end of the crown sipe, and a second portion extending axially inward from the axially outer end of the crown sipe, and the first portion and the second portion are inclined with respect to the tire axial direction.

Disclosure 10: The heavy duty tire according to Disclosure 9, wherein
the width of the first portion is larger than the width of the second portion.

Disclosure 11: The heavy duty tire according to Disclosure 5, wherein
the crown sipe has an axially inner end connected to the crown circumferential groove.

Disclosure 12: The heavy duty tire according to Disclosure 11, wherein
the crown sipe has an axially outer end connected to one of the crown shallow grooves.

Disclosure 13: The heavy duty tire according to Disclosure 12, wherein
each of the crown sipes comprises a first portion extending axially outward from the axially inner end of the crown sipe, and a second portion extending axially inward from the axially outer end of the crown sipe, and the first portion and the second portion are inclined with respect to the tire axial direction.

Disclosure 14: The heavy duty tire according to Disclosure 13, wherein
the width of the first portion is less than the width of the second portion.

Disclosure 15: The heavy duty tire according to any one of Disclosures 1 to 14, wherein
the groove bottom sipe has a width of 1.0 to 2.0 mm.

Disclosure 16: The heavy duty tire according to any one of Disclosures 1 to 15, wherein
the maximum depth of the groove bottom sipe is 70% or more of the groove depth of the crown circumferential groove.

DESCRIPTION OF THE REFERENCE SIGNS

6 Shoulder circumferential groove
7 Crown circumferential groove
9 Shoulder land portion
10 Crown land portion
12 Crown shallow groove
13 Crown block
20 Groove bottom sipe

The invention claimed is:
1. A heavy duty tire comprising:
a tread portion having tread edges and comprising land portions axially divided by circumferential grooves extending continuously in the tire circumferential direction, wherein
the circumferential grooves include a pair of shoulder circumferential grooves and at least one crown circumferential groove disposed therebetween,
the land portions include a pair of shoulder land portions defined between the tread edges and the shoulder circumferential grooves, and a pair of crown land portions defined between the shoulder circumferential grooves and the crown circumferential groove,
the axial width of each of the shoulder land portions is 17% to 28% of the tread width between the tread edges,
each of the crown land portions is circumferentially divided by crown shallow grooves into a row of crown blocks,
the groove depth of each of the crown shallow grooves is smaller than the groove depth of the crown circumferential groove,
the groove bottom of each of the crown shallow grooves is provided with a groove bottom sipe,
the groove bottom sipe of each of the crown shallow grooves extends zigzag over the entire length of the crown shallow groove and is composed of three portions arranged in a crank shape,
each of the crown blocks has a ground contacting top surface which has a maximum dimension in the tire axial direction and a maximum dimension in the tire circumferential direction which is 100% to 200% of the maximum dimension in the tire axial direction,
the ground contacting top surface of each of the crown blocks has a hexagonal shape of which width measured in the tire axial direction increases continuously from both ends in the tire circumferential direction toward the center therebetween,
the ground contacting top surface of each of the crown blocks is provided with an independent crown sipe extending from the crown circumferential groove to the adjacent shoulder circumferential groove,
each of the crown sipes comprises
a first portion extending axially outward from the crown circumferential groove and
a second portion extending from an axially outer end of the first portion to the adjacent shoulder circumferential groove,
wherein
the first portion and the second portion are inclined at different angles with respect to the tire axial direction, and
the width of the first portion is larger than the width of the second portion.

2. The heavy duty tire according to claim 1, wherein the groove depths of the crown shallow grooves are in a range from 10% to 20% of the groove depth of the crown circumferential groove.

3. The heavy duty tire according to claim 1, wherein each of the crown shallow grooves is a straight groove.

4. The heavy duty tire according to claim 3, wherein each of the first portion and the second portion of each crown sipes extends linearly.

5. The heavy duty tire according to claim 4, wherein the first portions of the crown sipes and the crown shallow grooves are all inclined in a same direction.

6. The heavy duty tire according to claim 1, wherein
each of the shoulder circumferential grooves is a zigzag groove having axially inwardly projecting vertices and axially outwardly projecting vertices,
the crown circumferential groove is a zigzag groove having vertices projecting toward one of the shoulder circumferential grooves, and vertices projecting toward the other of the shoulder circumferential grooves, and each of the crown shallow grooves is connected to one of the axially inwardly projecting vertices of one of the shoulder circumferential grooves, and one of the vertices of the crown circumferential groove projecting toward said one of the shoulder circumferential grooves.

7. The heavy duty tire according to claim 1, wherein the ground contacting top surface of each of the crown blocks has an axially inner corner protruding toward the crown circumferential groove, and an axially outer corner protruding toward the adjacent shoulder circumferential groove, and the crown sipe has an axially inner end connected to the axially inner corner.

8. The heavy duty tire according to claim 7, wherein the crown sipe has an axially outer end connected to the shoulder circumferential grooves at a position between the axially outer corner and one of the crown shallow grooves.

9. The heavy duty tire according to claim 1, wherein the groove bottom sipe has a width of 1.0 to 2.0 mm.

10. The heavy duty tire according to claim 1, wherein the maximum depth of the groove bottom sipe is 70% or more of the groove depth of the crown circumferential groove.

11. The heavy duty tire according to claim 1, wherein each of the three portions of each groove bottom sipe extends linearly.

12. A heavy duty tire comprising:

a tread portion having tread edges and comprising land portions axially divided by circumferential grooves extending continuously in the tire circumferential direction, wherein the circumferential grooves include a pair of shoulder circumferential grooves and at least one crown circumferential groove disposed therebetween, the land portions include a pair of shoulder land portions defined between the tread edges and the shoulder circumferential grooves, and a pair of crown land portions defined between the shoulder circumferential grooves and the crown circumferential groove, the axial width of each of the shoulder land portions is 17% to 28% of the tread width between the tread edges, each of the crown land portions is circumferentially divided by crown shallow grooves into a row of crown blocks, the groove depth of each of the crown shallow grooves is smaller than the groove depth of the crown circumferential groove, the groove bottom of each of the crown shallow grooves is provided with a groove bottom sipe, each of the crown blocks has a ground contacting top surface which has a maximum dimension in the tire axial direction and a maximum dimension in the tire circumferential direction which is 100% to 200% of the maximum dimension in the tire axial direction, the ground contacting top surface of each of the crown blocks has a hexagonal shape of which width measured in the tire axial direction increases continuously from both ends in the tire circumferential direction toward the center therebetween, the ground contacting top surface of each of the crown blocks is provided with a crown sipe, the crown sipe has an axially inner end connected to the crown circumferential groove, the crown sipe has an axially outer end connected to one of the crown shallow grooves, each of the crown sipes comprises a first portion extending axially outward from the axially inner end of the crown sipe and a second portion extending axially inward from the axially outer end of the crown sipe, wherein the first portion and the second portion are inclined with respect to the tire axial direction and the width of the first portion is less than the width of the second portion.

* * * * *